United States Patent
Petit-Huguenin et al.

(10) Patent No.: US 9,116,752 B1
(45) Date of Patent: Aug. 25, 2015

(54) SYSTEMS, METHODS, DEVICES AND ARRANGEMENTS FOR SERVER LOAD DISTRIBUTION

(75) Inventors: Marc Petit-Huguenin, Saratoga, CA (US); Bryan R. Martin, Sunnyvale, CA (US); Jim Kleck, Santa Cruz, CA (US)

(73) Assignee: 8x8, Inc., San Jose, CA (US)

( * ) Notice: Subject to any disclaimer, the term of this patent is extended or adjusted under 35 U.S.C. 154(b) by 870 days.

(21) Appl. No.: 12/726,289

(22) Filed: Mar. 17, 2010

Related U.S. Application Data

(60) Provisional application No. 61/163,192, filed on Mar. 25, 2009.

(51) Int. Cl.

| G06F 15/173 | (2006.01) |
|---|---|
| G06F 9/46 | (2006.01) |
| G06F 9/50 | (2006.01) |
| G06F 11/34 | (2006.01) |
| H04L 12/803 | (2013.01) |
| H04L 29/08 | (2006.01) |

(52) U.S. Cl.
CPC .............. *G06F 9/5083* (2013.01); *G06F 9/505* (2013.01); *G06F 11/3409* (2013.01); *G06F 11/3433* (2013.01); *H04L 47/125* (2013.01); *H04L 67/1004* (2013.01)

(58) Field of Classification Search
CPC ... G06F 9/5083; G06F 9/505; G06F 11/3409; G06F 11/3433; H04L 47/125; H04L 67/1004
USPC .......................................... 709/226; 718/105
See application file for complete search history.

(56) References Cited

U.S. PATENT DOCUMENTS

| 5,603,029 | A | * | 2/1997 | Aman et al. | 718/105 |
|---|---|---|---|---|---|
| 6,134,588 | A | * | 10/2000 | Guenthner et al. | 709/226 |
| 2002/0038360 | A1 | * | 3/2002 | Andrews et al. | 709/223 |
| 2002/0152307 | A1 | * | 10/2002 | Doyle et al. | 709/225 |
| 2003/0172163 | A1 | * | 9/2003 | Fujita et al. | 709/226 |
| 2004/0186920 | A1 | * | 9/2004 | Birdwell et al. | 710/1 |
| 2009/0207905 | A1 | * | 8/2009 | Tomita | 375/240.01 |
| 2009/0271206 | A1 | * | 10/2009 | Bhogal et al. | 705/1 |
| 2010/0030914 | A1 | * | 2/2010 | Sparks et al. | 709/235 |

OTHER PUBLICATIONS

Yamada, A.; Miyake, Y.; Terabe, M.; Hashimoto, K.; Kato, N., "Anomaly Detection for DNS Servers Using Frequent Host Selection," Advanced Information Networking and Applications, 2009. AINA '09. International Conference on , vol., No., pp. 853,860, May 26-29, 2009.*

(Continued)

*Primary Examiner* — Taylor Elfervig
(74) *Attorney, Agent, or Firm* — Crawford Maunu PLLC

(57) ABSTRACT

A variety of methods, systems, devices and arrangements are implemented for controlling server load-distributions. According to one such computer-implemented method, a desired server load-distribution is assigned for a plurality of computer servers that collectively provide services to computer clients. In response to a computer client request for service, a subset of computer servers is selected from the plurality of computer servers. Weight factors for servers of the selected subset of servers are determined as a function of the overall server load-distribution-profile and the selected subset.

24 Claims, 3 Drawing Sheets

(56) References Cited

OTHER PUBLICATIONS

Tang, W.; Du, F.; Mutka, Matt W.; Ni, L.M.; Esfahanian, A.-H., "Supporting global replicated services by a routing-metric-aware DNS," Advanced Issues of E-Commerce and Web-Based Information Systems, 2000. WECWIS 2000. Second International Workshop on , vol., No., pp. 67,74, 2000.*

Shaikh, A.; Tewari, R.; Mukesh Agrawal, "On the effectiveness of DNS-based server selection," INFOCOM 2001. Twentieth Annual Joint Conference of the IEEE Computer and Communications Societies. Proceedings. IEEE , vol. 3, No., pp. 1801,1810 vol. 3, 2001.*

* cited by examiner

US 9,116,752 B1

SYSTEMS, METHODS, DEVICES AND ARRANGEMENTS FOR SERVER LOAD DISTRIBUTION

RELATED DOCUMENTS

This patent document claims the benefit, under 35 U.S.C. §119(e), of U.S. Provisional Patent Application Ser. No. 61/163,192 filed on Mar. 25, 2009, and entitled "Systems, Methods, Devices and Arrangements for Server Load Distribution;" this patent document is fully incorporated herein by reference.

FIELD OF THE INVENTION

The present invention relates generally to server load distribution and to systems, methods and devices for facilitating network and processing distribution between multiple servers.

BACKGROUND

The demands on servers to provide adequate services to client devices are continuing to increase. In addition to ever increasing processing and bandwidth requirements, the number and variety of the services is also increasing. To meet these and other demands, it can be desirable to have a system that implements a number of servers, which can each provide similar functionality. These servers can be virtually identical to one another and operate in a parallel manner. Thus, to a user of the service, the servers appear as a single entity.

Some mechanisms must be employed to split duties between the different servers. For example, a device can be placed in front of the servers to distribute connections/services between the servers. Thus, incoming requests/connections are first received by the device. The device then distributes the workload between the servers. The present disclosure recognizes that this device may need to track the connections established because some services work only if all the components of a transaction are directed to the same server. This can create a bottleneck that frustrates linear scalability. Another issue recognized is that this kind of device requires specialization for the particular network service.

Another mechanism for implementing a scalable service is to have the (computer) client handle the load balancing. For this kind of load balancing, the client retrieves a list of servers available, and then chooses one randomly. The typical approach for implementing this is to use the Domain Name System (DNS) and multiple "A records." A records contain the mapping between a domain name and an IP address. As it is possible to associate multiple IP addresses to one A record, a service administrator can put in the A record the list of all servers available, and the client can choose one of them.

This DNS approach, however, requires limitations in the size of the data being returned as limited by design. For example, a standard DNS response carrying the IP addresses is limited to a size of 512 bytes. It might be possible to use another mechanism that allows for a greater size, such as TCP; however, TCP adds a lot of pressure on the DNS server and is generally not used for requests from a client. There is also a DNS extension (Request-For-Comments (RFC) 2671) to increase the size of a DNS packet to 1280 bytes, but this extension also has a limited number of IP addresses that can be put in a packet.

SUMMARY

Aspects of the present invention are directed toward control of network traffic that address challenges including those discussed above, and that are applicable to a variety of cellular applications, devices, systems and methods. These and other aspects of the present invention are exemplified in a number of implementations and applications, some of which are shown in the figures and characterized in the claims section that follows.

According to one embodiment of the present invention, a computer-implemented method includes assigning a desired server load-distribution for a plurality of computer servers that collectively provide services to computer clients. In response to a computer client request for service, a subset of computer servers is selected from the plurality of computer servers. Weight factors for servers of the selected subset of servers are determined as a function of the overall server load-distribution-profile and the size of the selected subset.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

Figure 1:
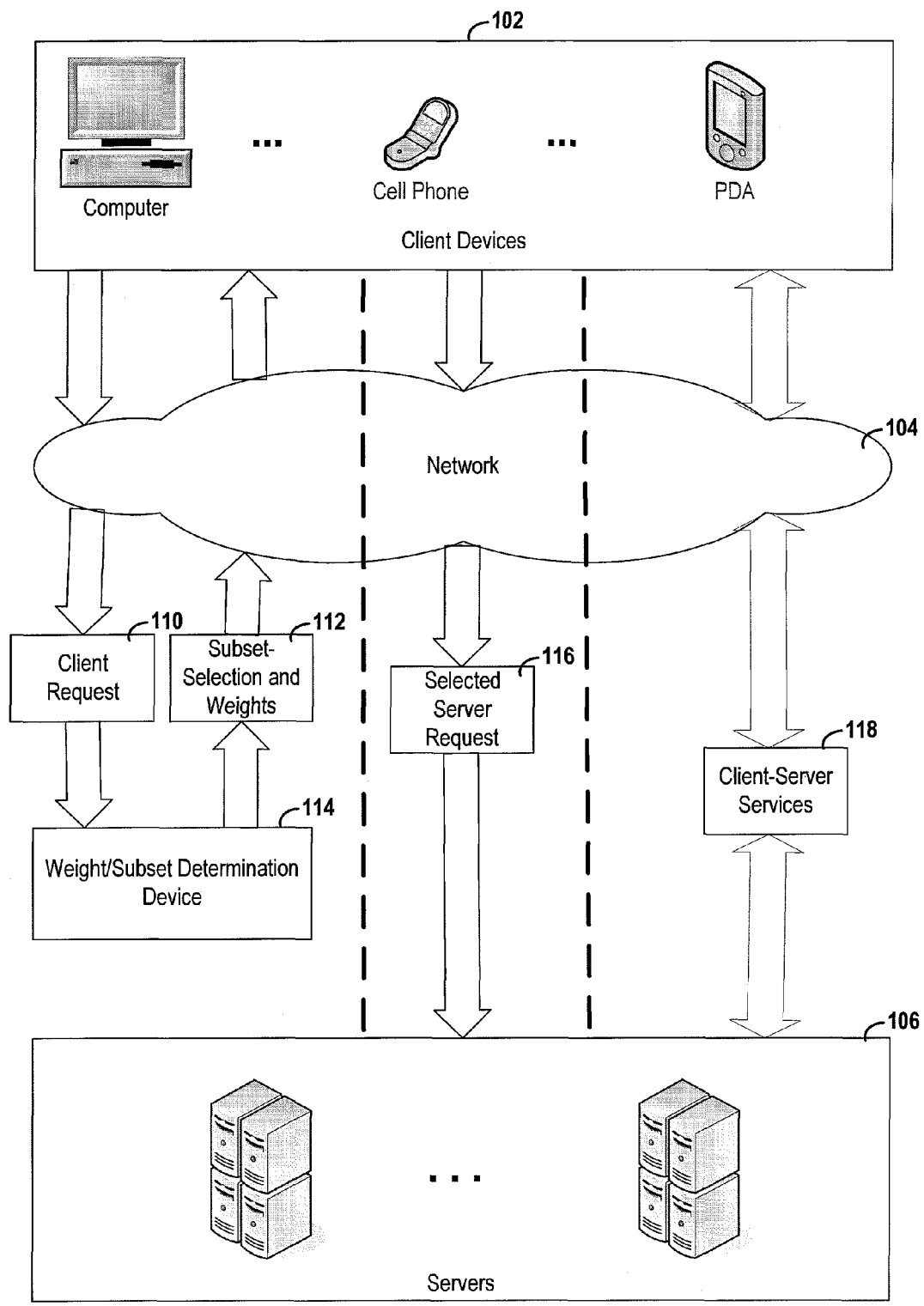
FIG. 1 shows an example load-distribution system that is consistent with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to load-sharing between servers providing packet-based communications over a network, such as the Internet, and related approaches, their uses and systems for the same. While the present invention is not necessarily limited to such applications, various aspects of the invention may be appreciated through a discussion of various examples using this context.

Aspects of the present invention are directed toward implementing distributed server-client connections that facilitate scaling of server-systems. An overall server-distribution-profile determines a desired ration of server connections/workloads for the servers within the server-system. This overall server-distribution-profile can be modified to accommodate different services. Other modifications can include, adding, removing or replacing servers with (or without) diverse performance profiles, or simply changing the desired workloads of the servers.

One aspect involves providing (computer) clients a list of a subset of all the servers in response to a service/connection request. This subset can be selected from all the servers using random selection. In this manner, each of the servers needs not be transmitted in response to each request. This can facilitate use of a very large number of servers. The (computer)

client selects a server in a manner that is consistent with the server-distribution-profile. For instance, each server is assigned a weight value that corresponds to the overall server-distribution-profile. Aspects of the present invention recognize that using a random subset has an effect on the actual load distribution between the servers. In one implementation, the weight value is modified to account for this effect.

Where there are a large number of servers, each identified by an IP address, the system can return a fixed number of random IP addresses from a pool of IP addresses. Each IP address has an equal chance to be selected and thus the probability for each IP address to be selected is the same as if all the IP addresses were returned to the client. This implementation does not, however, consider situations where the servers cannot handle an equal load. For instance, servers added over time are often not the same as the existing servers. Using an equal distribution of load means that the most powerful servers end up under-utilized and/or the least powerful servers end up over-utilized.

Other transmission protocols, such as service (SRV) records, can be used instead of A records. SRV records are defined by Request-for-Comments (RFC) 2782 to specify information about available services in the Internet Domain Name System. With SRV records, each server is associated with a priority and weight. The priority is used when there is a pool of spare servers (e.g., servers only used when other servers are unavailable). The weight is used to set the probability that a server will be selected by a client. Thus, a more powerful server can be assigned more weight to increase the likelihood of being selected, relative to a less powerful server.

When the number of servers becomes large, the SRV record size may be exceeded. Even when the size is not exceeded, the increased transmission size necessary to transmit additional server identifications can be undesirable. Thus, one implementation uses randomly chosen subsets for each connection request.

Aspects of the present invention recognize that a randomly chosen subset of SRV records changes the resulting probability of each SRV record and will create an under or over utilization of the servers and either waste resources or worse, overload servers and degrade the quality of the service.

Accordingly, an embodiment of the present invention adjusts the weight of the SRV records in the DNS server so the original probability assigned to each server is preserved even when a subset of the SRV records are sent. This is done so that the DNS server selects a number of SRV records that fit in a DNS response with equal probabilities (so it does not increase the load on the DNS server) and so that the client algorithm that is used to select a server from a list of SRV records does not need to be modified from the format described in RFC 2782.

In one implementation the DNS server returns a random subset of all the SRV records, the same way it does for the A records (e.g., equal opportunity for each record). The weights used by the clients are adjusted consistent with a random subset-method using an external program and the modified values are stored in the DNS server. Because of the interdependence between all the modified weights, the weights can be updated each time an original weight is modified or a server is added to or removed from the list.

According to another implementation, the DNS server uses a weight factor to select the subset of all the SRV records. For instance, a server with more capabilities can be selected as part of a subset more frequently than a server with fewer capabilities, thereby increasing the probability that servers with more capabilities will be selected.

An embodiment of the present invention uses a combination of modifications to the client weights and to the subset selection frequency. This combination of modifications is used to control the overall distribution of server connections.

According to one implementation of the present invention, a server load-profile algorithm is implemented to adjust server weights to be consistent with a desired overall server load-distribution-profile. In one instance, the algorithm accepts a variety of parameters. These parameters are used to determine adjustments to server weights. The parameters can include, but are not limited to, a desired overall server load-distribution-profile, currently-assigned server weights, server subset size provided to clients, client selection algorithms, types of service provided and current server loads.

In a particular implementation, the server subset size provided to the clients can be adjusted as a function of the desired overall server load-distribution-profile. In other implementations, the servers selected for a subset can be adjusted (e.g., selection other than truly random). For instance, the subset selection or size can be modified according to current server loads. Real-time monitoring of the server loads is often a difficult task that can require a substantial amount of overhead. To keep this aspect relatively simple, the server load component can be implemented using relatively basic monitoring and reporting functions. For instance, a count of active connections (or server idle time) for each server can be periodically provided. In another instance, servers that have excess service capacity can provide an indication of their excess. Servers without excess capacity need not provide any indication. In this manner, servers that are busy need not expend the processing/network resources necessary to communicate/assess their status.

Servers may have different capabilities, which may not scale in the same manner for different services. For example, a first server may have twice the processing power of a second server, while both servers have the same network bandwidth. Thus, processing-intensive services would benefit from a desired server load-distribution-profile that favors the first server, whereas network-intensive services would benefit from a relatively even distribution between the two servers. Accordingly, one embodiment of the present invention allows for the desired overall server load-distribution-profile to implement different distributions for different services. In one implementation, a set of weights is bound to a specific service. Each set of weights is bound to 4 values: protocol, service, subdomain and domain. For instance, a Web application can use 3 different services, with 3 different resources usage patterns:

Static web pages (low bandwidth, low CPU)
Dynamic web pages (low bandwidth, high CPU)
Images (high bandwidth, low CPU)

Each of these different services can use the same domain, protocol and service name (i.e., example.com, tcp and http), while still using a different subdomain, such as static, dynamic and image. The following naming convention can be used to represent this example:

Static web pages: _http._tcp.static.8x8.com.
Dynamic web pages: _http._tcp.dynamic.8x8.com.
Images: _http.tcp.image.8x8.com.

A different set of weights can then be associated to each usage:

_http._tcp.static.8x8.com.: server1=40%, server2=40%, server3=20%
_http._tcp.dynamic.8x8.com.: server4=10%, server5=45%, server6=45%
_http._tcp.image.8x8.com.: server7=33%, server8=33%, server9=33%

Server load requirements for the services are not always static and may vary over a period of time. One embodiment of the present invention modifies the desired server load-distribution-profile as the server load-requirements for the services change. Once the server load-distribution-profile has been modified, it can take some time before the desired load-distribution is achieved. This time becomes more important when clients are frequently added and removed. In one implementation, the server weights are weighted according to a graduated load-distribution-profile to achieve the desired load-distribution in a more rapid fashion. As clients are added (and removed) from the system the weights can be shifted to reach an equilibrium load-distribution that corresponds to the desired load-distribution. Once the actual load-distribution approaches the desired distribution (or after a set period of time), the desired distribution profile can be instituted.

According to another embodiment of the present invention, changes in weight value (e.g., for a newly added server) can be progressively increased over time. Clients access an authoritative DNS through a chain of DNS caches. Thus, it can take time for a modification to propagate from the authoritative DNS to the client. One problem with adding a new server occurs when a new server is added to the available pool of servers with an overly high weight value. If, however, the server cannot handle this load, it becomes necessary to correct/reduce the weight value. This correction of the weight will not be propagated immediately, causing customers to experience problems until all the caches are updated. Accordingly, one embodiment of the present invention increases the weight progressively until either the calculated weight is reached or a problem is detected. Such gradual increases can be combined with the monitoring described herein, thereby facilitating creation of a reliable system.

FIG. 1 shows an example system that is consistent with an embodiment of the present invention. Client devices 102 represent a number of different communication devices that connect to network 104. Non-limiting examples include home computers, cell phones, personal digital assistants (PDAs), television receivers, laptops and Voice over Internet Protocol (VoIP) devices. In one embodiment, network 104 is the Internet; however, the invention need not be so limited.

FIG. 1 shows communication flow between the client devices 102, the servers 106 and a weight/subset determination device 114. The vertical arrows represent communications between devices. These arrows are arranged to show an example sequence of communication events between devices with the first communications occurring on the left and the last communications occurring on the right. The communication events to the left of the first dotted line represent an initial connection client request and server subset/weight response. The center communication event, located between the dotted lines, represents a client request for a specific server. The bi-directional communication event, located on the right, represents the fulfillment of the client requested service/connection.

The first communication shown is a client request 110 for services from (and/or connections to) the servers 106. In response to this request the weight/subset determination device 114 determines and provides connection information to the requesting client device. This connection information can include weight values 112 for the servers. These weight values 112 can be used by the clients when selecting a server. For example, the client can add the total sum of the weight values for the servers. Each server can be associated with one or more numbers ranging from one to the total sum. The amount of numbers can be determined according to respective weight values. The client then randomly selects a number and connects to the server associated with that number.

In one implementation, the weight factors are calculated by adjusting the weight values in the subset so that the overall probability-ratio is maintained between servers and the subset. For example, the system could include seven servers. The servers could have the following desired percentage of all connections: 50%, 25%, 5%, 5%, 5%, 5% and 5%. As an example, the subset size could be two. The servers would be assigned a weight value that corresponds to the desired percentage of connection (e.g., 10, 4, 1, 1, 1, 1, and 1). Assuming that the subset selection randomly selects each of the seven servers for a subset size of two, the servers with a desired 5% connection will receive a disproportionate amount of connections and the server with a 50% weight factor will not receive enough connection. The weight factors can thus be adjusted to compensate for the effect of subset selection. In some situations it may not be possible to adjust the weight factors enough to compensate for the subset selection when the selection is random. For instance, a server that is randomly selected for a subset at a rate lower than the desired connection rate will not receive the desired connection rate (e.g., a server desires 30% of the workload, but is only selected for a subset 20% of the time will not receive more than 20% of the connection requests). Thus, various embodiments also allow for modifying the subset selection rate for the servers. This can be accomplished, for example, by adding a second weight factor into the subset selection process.

Once the client has selected a server using the provided weights and/or subset, the client sends a connection request 116 that specifies the selected server. The selected server responds to the client request and a connection is then established between the selected server and the requesting client device. This connection can be used to provide a variety of desired client-server services 118.

According to one embodiment of the present invention, weight/subset determination device 114 is implemented using a dedicated processor, server, circuit or device. Such a device can be assigned to handle all incoming requests from clients 102. In this manner, the servers 106 are free from handling this portion of the process. This allows for the device 114 to be located in physically different locations from one or more of the servers 106. In certain embodiments, device 114 can be implemented using a plurality of separate servers, processors, circuits or devices. In this manner the client requests can be distributed so as not to have single point of failure or a bottleneck. Various other configurations of devices are possible, such as a device that also serves as a gateway or router for one or more of the servers 106.

According to another embodiment of the present invention, weight/subset determination device 114 is implemented using software stored on a medium. When the software is executed by one or more of servers 106, the various steps are carried out. In this manner, the use of additional hardware can be avoided.

Figure 2:
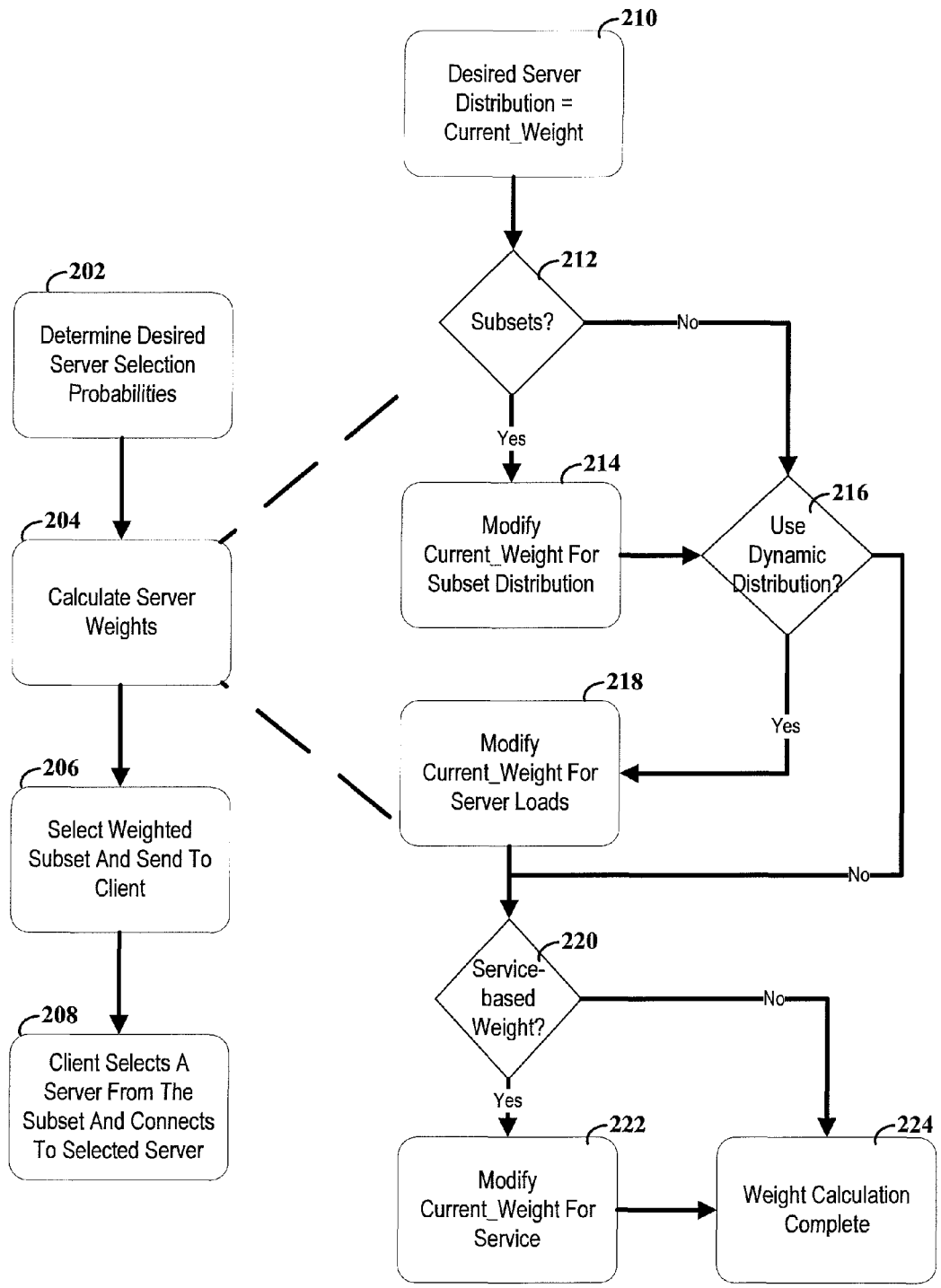
FIG. 2 depicts a flow diagram that is consistent with an example implementation of the present invention.

FIG. 2 depicts a flow diagram consistent with an example implementation of the present invention. This flow diagram represents an example algorithm for use in determining weight values. In response to a client request, the server selection probabilities are determined 202. From this information the server weights are calculated 204. A weighted subset of servers is then selected and sent to the requesting client 206. The client uses the provided weight values to select a server and then connects to that server 208.

According to implementations of the present invention, the calculation of server weights 204 can be implemented as a function of a variety of factors. One such implementation is shown by steps 210-224. At 210, the current server weights are equal to the desired server distribution. Decision block 212 is based upon a determination as to whether or not server subsets are used and provided in response to client requests. This ability to selectively use subsets allows for more flexibility in the functionality provided by the system. For example, if the system has only a few servers, all of the servers can be provided to the client. For systems with many servers, however, the clients can be provided with only a subset of the servers. If subsets are not used, the process bypasses the subset-based server weight modification of step 214. The subset-based server weight modification step 214 compensates for the subset-size and the subset-selection chance for the servers. During this step, it is also possible to modify the subset-selection chances of the servers, as discussed in more detail herein.

Decision block 216 allows for selective implementation of dynamic server weight modification 218. This modification can be implemented in response to any number of factors that would change the desired server-load distribution. For instance, the addition or subtraction of servers may change the desired server-load distribution. Changes in the network bandwidth capabilities represent another possible dynamic factor. Other, non-limiting, examples include server hardware changes or upgrades, software modifications, completion or starting of other server tasks and current server loads.

Decision block 220 allows for selective implementation of server weight modifications 222 as a function of the requested service. For instance, the servers may be capable of providing a number of different services and/or different levels of service depending upon the client request. For instance, streaming video services might require more processing bandwidth than other services. The desired server-load distribution for such processor intensive services might be different than for services that are light on processing requirements and heavy on network bandwidth requirements. The server weight can thus be modified accordingly.

Upon completion of the desired server weight modification, the current server weight is provided 224. The various different server weight modifications can be optionally implemented as desired. Moreover, server weight modification factors can be used other than those explicitly discussed herein.

According to one embodiment of the present invention, the server weight calculation is substantially isolated from individual client requests. In this manner, the server weight calculation can be thought of as a pre-calculation of weight values for subsequent use by the system. This pre-calculation can be implemented once upon initialization of the system, periodically and/or in response to changes in the system dynamics/setup. In a particular implementation, the pre-calculation can be performed for a number of different subset sizes. The proper weight calculation values can then be selected based upon the subset size allowed/used in connection with each client request.

Other variations to the algorithm are also possible. In one such variation, the total number of servers returned in the subset can be modified as desired. For instance, the subset can be determined by randomly selecting servers from the list of all available servers. This selection can be implemented for a set number of the subset. For instance, the number of servers in the subset could be the least of the total number of servers and the total number able to be transmitted (e.g., as limited by SRV record size). The weight of each server could be used during the selection of the subset. In one such implementation, the selection allows for random selection of the same server to occur multiple times. Each time a server is selected, the weight value is increased. In this manner the probability is maintained for the overall system. This method of increasing the weight value has the potential to exceed the maximum allowable weight value. In one implementation, the weight values of all servers could be reduced proportionally to keep the weight value of the server below the maximum allowable value while maintaining the overall ratio. In another implementation, multiple server entries can be included in the subset for the same server. In this manner, when a server is randomly selected a second time, a duplicate server entry is included in the subset.

An example implementation is as follows. Servers 1-6 are part of the server array. The servers have the following desired weights/load distributions Server 1=1; Server 2=3; Server 3=1; Server 4=4; Server 5=1 and Server 6=3. The subset size is set to 3 servers. In response to a client connection request, a server subset is generated by randomly selecting 3 servers. The subset selection is implemented so that the servers are selected according to the following probabilities: Server1=1/13; Server 2=3/13; Server 3=1/13; Server 4=4/13; Server 5=1/13 and Server 6=3/13. If a server is randomly selected twice for the same subset, the weight value sent to the client is increased accordingly. Thus, if Server 6 is randomly selected twice, the weight is increased to 6. If Server 4 were selected N times, the weight value would be the weight value (4)*N. In another implementation, if a server is randomly selected more than once, multiple server entries for that server are included in the server entry. For instance, a server selected N times the subset could contain N entries that are directed toward the IP address for the same server. Each of the entries would have the weight value for that server.

In one embodiment, the weight/probability modifications can be implemented using a dedicated device. In other embodiments, the weight/probability modifications can be implemented using one or more of the servers.

Figure 3:
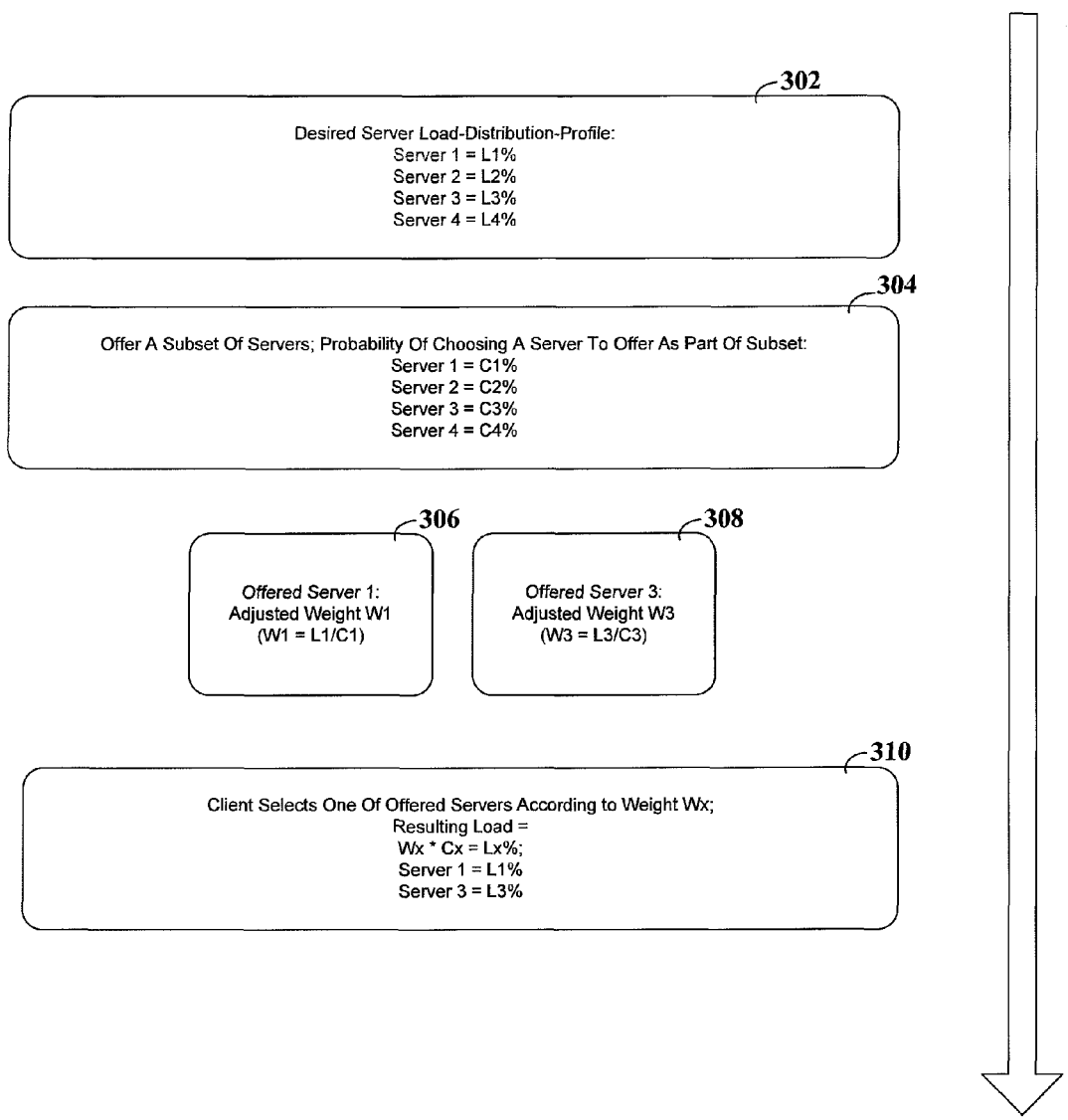
FIG. 3 shows a block diagram of server weight modifications based upon a desired server load-distribution profile and a subset size, according to an example embodiment of the present invention.

FIG. 3 shows a block diagram of server weight modifications based upon a desired server load-distribution profile and a subset size, according to an example embodiment of the present invention. This figure shows an example embodiment for 4 servers. Block 302 depicts the desired server-load distribution for the 4 servers. Each server has a corresponding distribution percentage $L_x$, where x represents one of the 4 servers. Block 304 depicts the probability of each server being selected for a subset $C_x$ %. Blocks 306 and 308 each show two selected servers. In this specific, non-limiting, example the subset size is 2 and the selected servers are Server 1 and Server 3. The adjusted weight is shown as $W_1$ and $W_3$ respectively. This can be calculated as a function of the probability of selection and the desired server load-distribution for the respective server. Block 310 represents the client selecting from the subset of servers and connecting to the selected server.

The realized load distribution is a function of the server weight, the subset size and the server selection chance for the subset. The following example provides one example implementation for determining the weight ($W_x$) for servers.

First assume that servers exist with the following desired load % ($L_x$):

$L_1 = 10\%$ $L_2 = 20\%$ $L_3 = 40\%$ $L_4 = 30\%$

Assuming a random subset selection, odds of selecting a server per subset slot (Sx):

$$S1 = 25\%/\text{subset slot}$$

$$S2 = 25\%/\text{subset slot}$$

$$S3 = 25\%/\text{subset slot}$$

$$S4 = 25\%/\text{subset slot}$$

Assuming a subset size of N, each server will be selected for a subset Sx*N (e.g., N=2 and Sx=25% results in a 50% selection chance for any particular client request).

The probability of a server being selected by any particular client request is therefore dependent upon the weight (Wx) of the server and the weight of each of the other servers:

$$L1 = (33\%(W1/(W1+W2)) + 33\%(W1/(W1+W3)) + 33\%(W1/(W1+W4)))NS1$$

$$L2 = (33\%(W2/(W2+W1)) + 33\%(W2/(W2+W3)) + 33\%(W2/(W2+W4)))NS2$$

$$L3 = (33\%(W3/(W3+W1)) + 33\%(W3/(W3+W2)) + 33\%(W3/(W3+W4)))NS3$$

$$L4 = (33\%(W4/(W4+W1)) + 33\%(W4/(W4+W2)) + 33\%(W4/(W4+W3)))NS4$$

Substituting the known values into these equations leads to:

$$10\% = (33\%(W1/(W1+W2)) + 33\%(W1/(W1+W3)) + 33\%(W1/(W1+W4)))50\%$$

$$20\% = (33\%(W2/(W2+W1)) + 33\%(W2/(W2+W3)) + 33\%(W2/(W2+W4)))50\%$$

$$40\% = (33\%(W3/(W3+W1)) + 33\%(W3/(W3+W2)) + 33\%(W3/(W3+W4)))50\%$$

$$30\% = (33\%(W4/(W4+W1)) + 33\%(W4/(W4+W2)) + 33\%(W4/(W4+W3)))50\%$$

The above formulas are merely representative and can be modified according to different distribution schemes, different selection algorithms and the like. For instance, one embodiment of the present invention calculates the adjusted weight values as a function of the desired weight of each server and the number of SRV records in a DNS packet response.

These and other aspects of the present invention can be implemented in a number of different manners including, but not limited to, stored executable data, computer processors, programmable logic, hardware circuit logic and combinations thereof The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with voice-over Internet services, streaming media and call-processing. The invention may also be implemented using a variety of approaches such as those involving a number of different operating systems and software programs/packages. Such modifications and changes do not depart from the true spirit and scope of the present invention, including that set forth in the following claims.

What is claimed is:

1. A computer-implemented method for responding to computer client requests for services provided by a plurality of computer servers, the method comprising:
    assigning a desired server load-distribution for the plurality of computer servers that collectively provide services to computer clients;
    determining, in response to a computer client request for service indicated by a domain-name-server (DNS) query, weight factors for one or more of the plurality of computer servers available to provide the service of the computer client request as a function of the desired server load-distribution and an upper limiting number of service records supported by a DNS packet response;
    selecting a subset of the plurality of computer servers available to provide the service of the computer client request, the subset including at least two computer servers; and
    transmitting a DNS packet response, having service records in the DNS packet response that identify the selected subset of computer servers; and
    wherein the weight factors are set so that a probability of one of the computer servers being selected for the subset and being randomly selected from the subset is proportional or directly related to a percentage of use of the computer server according to desired server load-distribution for the plurality of computer servers.

2. The method of claim 1, wherein the selecting of the subset is performed as a function of the determined weight factors, where the determined weight factors indicate a probability that one of the computer servers will be selected for the subset.

3. The method of claim 2, further including in response to selecting the subset, modifying the weight factors for the computer servers in the subset.

4. The method of claim 2, wherein the subset of computer servers includes a duplicate entry for at least one computer server.

5. The method of claim 2, further including modifying the desired server load-distribution in response to data received about current loads of the computer servers.

6. The method of claim 1, wherein in response to a change in the desired server load-distribution, the claimed method uses a graduated server load-distribution to reach the desired server load-distribution and thereafter uses the desired server load-distribution.

7. The method of claim 1, wherein
    the determined weight factors for computer servers of the selected subset are set to a graduated load-distribution, and the graduated load-distribution is adjusted down in response to an actual load-distribution approaching the desired server load-distribution.

8. The method of claim 1, wherein
    the determined weight factor for each computer server of the selected subset indicates a weight percentage that is different than a desired load percentage from the desired server load-distribution.

9. The method of claim 1, wherein the desired server load distribution indicates a desired load of a first one of the plurality of computer servers that is different than a desired load of a second one of the plurality of computer servers.

10. The method of claim 1, further comprising, in response to an addition of a new server to the plurality of computer servers, setting a weight for the new server and gradually increasing the weight until the weight corresponds to a desired load for the new server in the desired server load-distribution.

11. The method of claim 1, wherein a size of the selected subset corresponds to a limited number of IP addresses that can be put in the DNS packet response.

12. The method of claim 1, wherein the desired server load-distribution has a first ratio between computer servers in the selected subset and wherein the determined weight factors between the computer servers in the selected subset has a second, different ratio, and wherein the determined weight factors are configured to achieve the desired server load-distribution.

13. The method of claim 12, wherein the determining of the weight factors for the selected subset preserves the desired server load-distribution for each computer server based upon a probability of the selected computer servers being selected from all available computer servers.

14. An apparatus, comprising a processing circuit configured and arranged to
assign a desired server load-distribution for a plurality of computer servers that collectively provide services to computer clients;
in response to a request from a computer client for service indicated by a domain-name-server (DNS) query, select a subset of computer servers that are available to provide the requested service from the plurality of computer servers, the subset including at least two computer servers, and determine weight factors for computer servers of the selected subset of computer servers as a function of the desired server load-distribution and an upper limiting number of service records supported by a DNS packet response; and
transmit to the computer client a DNS packet response having service records in the DNS packet response that identify the selected subset of computer servers and the determined weight factors, wherein the weight factors are set so that a probability of one of the computer servers being selected by the computer client based on the weight factors is proportional or directly related to a percentage of use of the computer server consistent with the desired server load-distribution for the plurality of computer servers.

15. The apparatus of claim 14, wherein the processing circuit is configured and adapted to select the subset of computer servers using random selection from the plurality of computer servers.

16. The apparatus of claim 14, wherein the processing circuit is configured and adapted to adjust weight factors as a function of current server loads.

17. The apparatus of claim 14, wherein the processing circuit is further configured and adapted to adjust a probability that one of the computer servers will be selected for the subset as a function of the desired server load-distribution and a size of the subset.

18. The apparatus of claim 14, wherein the determining weight factors is further a function of how many service records are in a Domain Name Service (DNS) packet response.

19. The apparatus of claim 14, wherein the processing circuit is further configured and adapted to modify the desired server load-distribution in response to data received about current loads of the computer servers.

20. The apparatus of claim 14, further configured and adapted to use a graduated server-load distribution, wherein in response to a change in the desired server load-distribution, the graduated server-load distribution is used to reach the desired server load-distribution and thereafter the desired server load-distribution is used.

21. The apparatus of claim 14, wherein the processing circuit is configured and adapted to determine weight factors for computer servers of the selected subset of computer servers by adjusting the desired load distribution for each computer server of the selected subset according to a probability of each computer server being selected for the subset.

22. The apparatus of claim 21, wherein the processing circuit is configured and adapted to determine weight factors for computer servers of the selected subset of computer servers by further adjusting the desired load distribution for each computer server of the selected subset according to a graduated probability for computer servers having a higher desired load distribution relative to other computer servers.

23. The apparatus of claim 14, wherein the processing circuit is configured and adapted to select the subset of computer servers from the plurality of computer servers as a function of the desired load distribution for each computer server.

24. An apparatus, comprising:
a processing circuit configured and arranged to assign a desired server load-distribution for a plurality of computer servers that collectively provide services to computer clients;
a processing circuit configured and arranged to
select, in response to a request from a computer client for service indicated by a domain-name-server (DNS) query, a subset of computer servers that are available to provide the requested service from the plurality of computer servers, the subset including at least two computer servers, and
transmit a DNS packet response having service records in the DNS packet response that identify the subset of computer servers to the computer client;
a processing circuit configured and arranged to determine weight factors for computer servers of the selected subset of computer servers as a function of the desired an overall server load-distribution and an upper limiting number of service records supported by the DNS packet response; and
wherein the weight factors are set so that a probability of one of the computer servers being randomly selected by the computer client is proportional or directly related to a percentage of use of the computer server consistent with the desired server load-distribution for the plurality of computer servers.

* * * * *